Aug. 5, 1924.  
H. Z. COBB  
1,503,883  
RING FOR TIRE BEADS  
Filed April 13, 1922
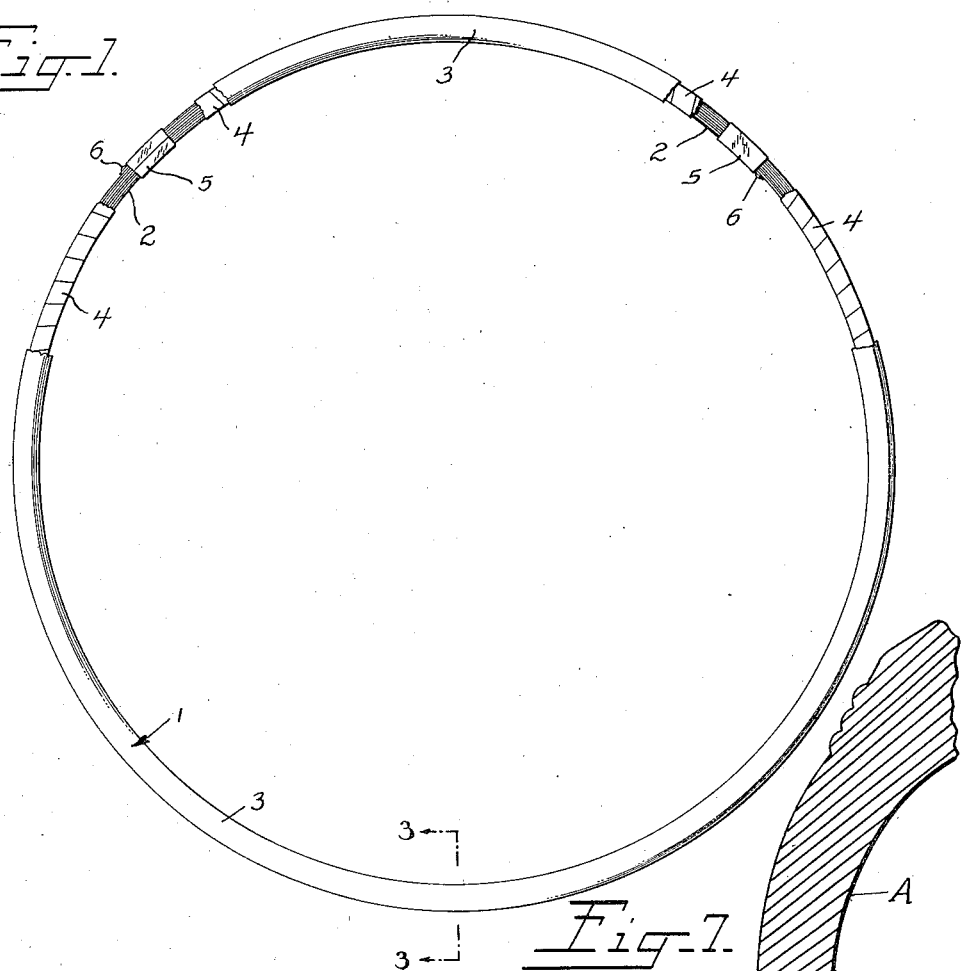
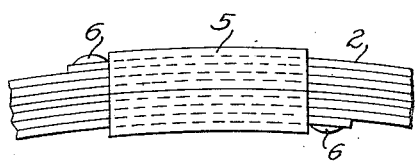
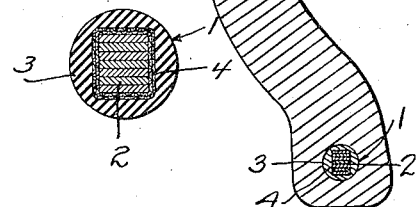
  
Inventor.  
HENRY Z. COBB.  
By his Attorney  
Ernst Hopkinson Patented Aug. 5, 1924.

1,503,883

UNITED STATES PATENT OFFICE.

HENRY Z. COBB, OF NEW YORK, N. Y., ASSIGNOR TO MORGAN & WRIGHT, A CORPORATION OF MICHIGAN.

RING FOR TIRE BEADS.

Application filed April 13, 1922. Serial No. 552,361.

*To all whom it may concern:*

Be it known that I, HENRY Z. COBB, a citizen of the United States, residing at New York, county of New York and State of New York, have invented certain new and useful Improvements in Rings for Tire Beads, of which the following is a full, clear, and exact description.

This invention relates to reinforcing rings for tire beads, and has for its principal object the production of a superior ring at a reduced cost.

Referring to the accompanying drawings showing various embodiments of the invention.

Fig. 1 is a completed ring of one embodiment of the invention with certain portions broken away to show the interior;

Fig. 2 is an enlarged fragmental view of the ring of Fig. 1 showing one form of fastening means;

Fig. 3 is an enlarged sectional view taken through the plane 3—3, Fig. 1; and

Figs. 4, 5, and 6 are sectional views of rings showing possible modifications.

Fig. 7 is a transverse sectional view of a portion of a tire casing showing the reinforcing ring embedded in the bead portion thereof.

The ring 1 as shown in Figs. 1, 2 and 3 is formed of a flat metal strip 2 which is preferably made of steel. The strip is formed into a ring which is of a cross-section suitable for building into the edge or bead of the tire for which it is intended, as clearly shown in Fig. 7, which shows in section a fragment of a conventional form of tire casing A in outline, it being understood that the casing may be formed of any number of plies of rubberized fabric and other parts to conform to any preferred or well-known construction. The size of the strip will depend much upon the nature and strength of the material used and the number of convolutions or plies employed to form the ring. I have found a strip wound to produce seven plies or convolutions gives very satisfactory results, and I prefer to use a strip of suitable size so that about seven convolutions will produce a ring substantially square in cross-section. These, however, are not essential features, it only being necessary that the required strength be obtained, as the novelty of my invention resides in the employment of strip metal to form the ring.

It is, of course, desirable, as with other rings for tire beads, that the ring be firmly secured in the bead or edge of the tire, and I therefore encase the ring in a plastic covering 3 which is preferably made of a suitable rubber compound which is placed in a mold and vulcanized to any degree desired. Generally however, only a partial vulcanization is given to the rubber, and the vulcanization is completed when the tire is subjected to its vulcanizing process. As an extra precaution to secure the convolutions of the ring together and to better hold it permanently in place within the tire, I first cover the ring with a fabric covering 4 which may be treated with rubber in any desirable manner, and which in the present instance is shown wound about the ring to form the cover. It may, however, if desired, be wrapped longitudinally of the ring or otherwise. The fabric covering snugly adheres to the ring and forms a strong base for the rubber outer covering, between which and the fabric there is a very strong adhesion produced during the vulcanizing process. The fabric and outer rubber covering, or either of them if only one is employed, serve to firmly hold the several convolutions of the metal strip forming the ring firmly together in exact alinement and in strong frictional contact with each other so that there will be no slipping between the convolutions when the tire is placed under load. Although the frictional contact of the adjacent convolutions will usually be sufficient to withstand the load, additional resistance may be added when desired, for instance the strip may be first rubber coated and then wound to form the ring, the coating being finally vulcanized, thereby holding the convolutions more firmly together.

The wrappings may also serve to secure the ends of the strip in place but I prefer to use other means. In the present instance I employ a metal clip 5 which is snugly folded around the ring at the end of the band and the end is preferably struck up to form the stop 6 against which the clip is placed. Both the upper and lower ends of the spirally wound strip are thus formed with stops and where they meet at approximately the same place a single clip will suffice. I prefer, however, to carry the ends so that they will lap over a suitable distance and have found a lap of a quarter to a third of the circumference of the ring to give good results. In such an instance I employ two clips as shown in Fig. 1. Obviously through the distance of this lap between clips there will be an additional ply of metal strip which will afford sufficient surface contact to obviate any tendency of slipping at the end portions. While I have shown a metal clip for securing the ends of the metal strip other securing means may be employed, as for instance, the end may be soldered or spot-welded to the body of the ring.

While I have thus far referred particularly to a flat metal strip this may be replaced by a strip formed to produce an interlocking of the successive convolutions forming the ring. The interlocking feature of my invention is illustrated by the three modified forms shown in Figs. 4, 5 and 6 although it is obvious other forms may be employed to produce this result without departing from the present invention. Fig. 4 shows a strip 7 curved transversely. Fig. 5 shows a strip 8 bent or formed to assume a transverse angle with the vertex preferably centrally located, and Fig. 6 shows a strip 9 which is bent or formed with a rib or bead preferably centrally located. Each of these forms may be generally described as having angular cross-sectional formations which produce an interlocking of the various convolutions or plies forming the ring thereby more securely holding them together against possible lateral displacement.

It will be noted from the above that in all instances the ring is formed from strip metal, and while the term "flat strip metal" has been used to distinguish the embodiments shown in Figs. 1, 2, and 3 from those shown in Figs. 4, 5, and 6, in the broader sense all of the embodiments are made from flat strip metal as distinguished from a possible broad use of the word "strip" to include lengths of metal of other cross-sections such as round, square, and the like, which are not included in the present invention. Therefore, where the term "flat" is used in the claims it is intended to include any of the embodiments shown in the drawings or similar embodiments unless otherwise limited. And it is thus used in the claims to clearly differentiate from any loose use of the word "strip" that might include tire bead rings made of wire having a cross-section as round, square, or otherwise shaped that will produce a tire bead ring similar to those disclosed in the prior art, and which have nothing to do with the present invention. It will further be noted that in a ring constructed according to the present invention the width of the strip forming the plies of the ring is in a general direction at right angles to the plane of the ring, instead of being in a radial plane as a disk-shaped ring would be, and that the ring is constructed to present a fixed circumference capable of withstanding the outward bursting force that it is subjected to when in service. Furthermore, a ring constructed according to the present invention is characterized, as will be apparent from an inspection of the several cross-sectional views shown in the drawings, by having a uniform cross-section throughout and further by being symmetrical on both sides of a medial radial plane.

My bead rings, on account of their simplicity of construction, can be manufactured with a much higher degree of uniformity than the bead rings usually employed at present and for this reason a much lower margin of safety may be employed with a corresponding saving in cost of manufacture than in the usual bead ring. While I prefer to provide special machinery for the building of the bead ring, nevertheless it is possible if found advantageous in certain methods of building tires, to wind the metal strip to form the ring directly on the edge of the tire as the tire parts are being assembled. This, of course, would necessitate the fabric covering, if same were to be used, to be formed of a strip of fabric laid longitudinally about the ring.

In the usual types of ring formed of a wire twisted into a cable there is a tendency for the twisted strands forming the cable to stretch or straighten out when under strain which would result in a stretching or an enlarging of the ring. Great care is exercised to form the rings of the exact dimension required and obviously when these are built in the casing and the casing is vulcanized, the rings are firmly secured by the vulcanized rubber to the other parts of the tire edge, and it would be decidedly detrimental if the reinforcing rings became stretched in the tire. Not only would this stretch affect their efficiency in holding the tire upon the rim but there would also be a tendency for the ring as it is being stretched to break away from the encasing walls of the tire edge. My reinforcing ring differs materially from those made of wire. In the preferred embodiment each convolution of the metal strip is wound tightly upon the previous convolution and as there is an entire absence of the twisting that is required to produce the wire cable ring there is therefore no tendency to stretch. Moreover while my ring will flex in the plane of the ring it is very rigid in a transverse plane and therefore offers a much stronger resistance to rolling about its cross-sectional axis than rings made of wire. This is important when the ring is used in tires formed from structures made in the flat pulley band shape and then inflated to tire shape, for here the bead or edge of the tire in turning from the flat position to the tire position revolves approximately 90° and there is a very strong tendency for the ring to revolve likewise. This, in the case of a wire ring, would force the inner circumferential portion outwardly and likewise the outer circumferential portion would be forced inwardly. The ring would thus be distorted and the strands composing it disarranged. The outer circumferential portion in turning toward the inner circumference would present a fullness or slackening of the strands while the inner circumferential portion in turning toward the outer circumference would be unduly stretched. Thus the ring would be materially weakened. There is not this tendency to rolling in a ring made of strip metal. It is much more stable and will with a greater degree of certainty maintain its preformed position when used in a casing of this type.

As many apparently different embodiments of this invention may be made without departing from the spirit thereof, it is to be understood that I do not intend to limit myself to the specific forms of the invention as set forth except as indicated in the appended claims.

Having thus described my invention, what I claim and desire to protect by Letters Patent is:

1. A reinforcing ring of fixed circumference for a tire bead formed of flat strip metal of uniform cross-section throughout having its width disposed at a right angle to the plane of the ring, said ring being symmetrical on both sides of a medial radial plane.

2. A reinforcing ring of fixed circumference for a tire bead formed of flat strip metal of uniform cross-section throughout wound longitudinally of the ring and having its ends overlapping, said ring being symmetrical on both sides of a medial radial plane.

3. A reinforcing ring of fixed circumference for a tire bead formed of flat strip metal of uniform cross-section throughout running longitudinally of the ring and having its ends overlapping and secured to the body of the ring, said ring being symmetrical on both sides of a medial radial plane.

4. A reinforcing ring of fixed circumference for a tire bead formed of flat strip metal of uniform cross-section throughout wound longitudinally of the ring to form a plurality of metal plies, said ring being symmetrical on both sides of a medial radial plane.

5. A reinforcing ring of fixed circumference formed of flat strip metal of uniform cross-section throughout wound longitudinally of the ring to form a plurality of metal plies having the ends secured to the body of the ring, said ring being symmetrical on both sides of a medial radial plane.

6. A reinforcing ring of fixed circumference for a tire bead formed of flat strip metal of uniform cross-section throughout and covered with adhesive material, said ring being symmetrical on both sides of a medial radial plane.

7. A reinforcing ring of fixed circumference for a tire bead formed of flat strip metal of uniform cross-section throughout, and a plastic covering enclosing the metal, said ring being symmetrical on both sides of a medial radial plane.

8. A reinforcing ring of fixed circumference for a tire bead formed of flat strip metal of uniform cross-section throughout, and a rubberized fabric covering enclosing the metal, said ring being symmetrical on both sides of a medial radial plane.

9. A reinforcing ring of fixed circumference for a tire bead formed of flat strip metal of uniform cross-section throughout, a fabric covering enclosing the metal, and a plastic covering enclosing the fabric, said ring being symmetrical on both sides of a medial radial plane.

10. A reinforcing ring of fixed circumference for a tire bead formed of flat strip metal of uniform cross-section throughout and a vulcanized rubber covering enclosing the metal, said ring being symmetrical on both sides of a medial radial plane.

11. A reinforcing ring of fixed circumference for a tire bead formed of flat strip metal of uniform cross-section throughout spirally wound upon itself to form a plurality of plies, said ring being symmetrical on both sides of a medial radial plane.

12. A reinforcing ring of fixed circumference for a tire bead formed of a plurality of plies of strip metal and interlocking parts formed on the said plies for securing them together.

13. A reinforcing ring of fixed circumference for a tire bead formed of a plurality of plies of strip metal having interlocking angular cross-sectional portions securing the plies together.

14. A reinforcing ring of fixed circumference for a tire bead formed of a plurality of plies of strip metal bent along its longitudinal center to provide an interlocking angular cross-section for securing the plies together.

Signed at Passaic, county of Passaic, and State of New Jersey, this 10th day of April, 1922.

HENRY Z. COBB.